(12) United States Patent
Shao et al.

(10) Patent No.: US 12,470,065 B2
(45) Date of Patent: Nov. 11, 2025

(54) POWER SUPPLY SYSTEM AND CURRENT CONVERSION METHOD

(71) Applicant: Huawei Digital Power Technologies Co., Ltd., Shenzhen (CN)

(72) Inventors: Zhangping Shao, Shanghai (CN); Kai Xin, Shanghai (CN); You Zhou, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 12 days.

(21) Appl. No.: 18/668,538

(22) Filed: May 20, 2024

(65) Prior Publication Data

US 2024/0305099 A1    Sep. 12, 2024

Related U.S. Application Data

(63) Continuation of application No. PCT/CN2021/134507, filed on Nov. 30, 2021.

(51) Int. Cl.
*H02J 3/18*    (2006.01)
*H02J 3/38*    (2006.01)

(52) U.S. Cl.
CPC .............. *H02J 3/1835* (2013.01); *H02J 3/38* (2013.01); *H02J 2300/24* (2020.01); *H02J 2300/28* (2020.01)

(58) Field of Classification Search
CPC ........ H02J 3/1835; H02J 3/38; H02J 2300/24; H02J 2300/28
USPC .......................................................... 307/84
See application file for complete search history.

(56) References Cited

U.S. PATENT DOCUMENTS

| 9,631,608 | B2* | 4/2017 | Garcia ................... H02P 9/102 |
| 11,817,712 | B2* | 11/2023 | Huang ...................... H02J 3/48 |
| 2015/0361954 | A1 | 12/2015 | Nelson et al. | |

FOREIGN PATENT DOCUMENTS

| CN | 104362667 A | 2/2015 |
| CN | 104396113 A | 3/2015 |
| CN | 104578151 A | 4/2015 |
| CN | 105591401 A | 5/2016 |
| CN | 105914778 A | 8/2016 |
| CN | 106684852 A | 5/2017 |
| CN | 106921177 A | 7/2017 |
| CN | 109378860 A | 2/2019 |
| CN | 110098640 A | 8/2019 |
| WO | 2021114588 A1 | 6/2021 |

* cited by examiner

*Primary Examiner* — Hal Kaplan
(74) *Attorney, Agent, or Firm* — Maier & Maier, PLLC

(57) ABSTRACT

A converter circuit is configured to output a first reactive current to a power grid when a voltage value of an output port of the converter circuit decreases from a first working voltage value to a second working voltage value. The drive control circuit is configured to: in a process in which the converter circuit outputs the first reactive current to the power grid, when it is detected that the voltage value of the output port of the converter circuit increases to a third working voltage value and the third working voltage value is greater than or equal to a first recovery voltage value, control the converter circuit to output a second reactive current to the power grid, to recover the voltage value of the output port of the converter circuit to the first working voltage value.

19 Claims, 8 Drawing Sheets

POWER SUPPLY SYSTEM AND CURRENT CONVERSION METHOD

CROSS-REFERENCE TO RELATED APPLICATIONS

This application is a continuation of International Application No. PCT/CN2021/134507, filed on Nov. 30, 2021, the disclosure of which is hereby incorporated by reference in its entirety.

TECHNICAL FIELD

This application relates to the field of electronic power technologies, a power supply system, and a current conversion method.

BACKGROUND

A power supply system may include a power supply system of photovoltaic power generation, a supply system of wind power generation, and the like. Different types of power supply systems have different types of power generation apparatuses. Currently, in various types of power supply systems, a power generation apparatus of the power supply system may be connected to a power grid by using a converter. After electric energy generated by the power generation apparatus is output to the converter, the converter may adjust a current of an output port of the converter to adjust a voltage to be transmitted to the power grid, so that the power grid uses the voltage. In addition, when the power grid is faulty and consequently, a voltage of the output port of the converter in the power supply system changes, the converter in the power supply system may adjust the current of the output port of the converter, to adjust the voltage to be transmitted by the converter to the power grid, so as to maintain working of the power grid. For example, when a ground-inductive short circuit occurs in the power grid and consequently, the voltage to be transmitted by the output port of the converter to the power grid decreases, the converter may perform voltage ride-through (the converter may increase an output reactive current to increase the voltage of the output port of the converter), to ensure that the output port of the converter transmits an enough voltage to the power grid, to maintain running of the power grid. However, in such a power supply system, a connected power grid may have high resistance. When the power grid is faulty, because the power grid has high resistance, increasing the reactive current output by the converter significantly increases the voltage to be transmitted by the output port of the converter to the power grid, so that the converter stops outputting (or decreases) the reactive current before a fault in the power grid is troubleshot, and the voltage to be transmitted by the output port of the converter to the power grid decreases again. Consequently, the converter repeatedly outputs (or increases) and stops outputting (or decreases) the reactive current, the power supply system has poor stability, and security is low.

SUMMARY

The embodiments provide a power supply system and a current conversion method, so that a converter can stably output a reactive current in a period in which a power grid is faulty, circuit oscillation decreases, a structure is simple, a control method is simple, and security is high.

According to a first aspect, an embodiment provides a power supply system. The power supply system includes a power generation apparatus, a converter circuit, and a drive control circuit. Herein, the power generation apparatus may be connected to an input port of the converter circuit, an output port of the converter circuit may be connected to a power grid, and the drive control circuit may be connected to the converter circuit. The converter circuit herein may be configured to output a first reactive current to the power grid when a voltage value of the output port of the converter circuit decreases from a first working voltage value to a second working voltage value and the second working voltage value is less than or equal to a first trigger voltage value, to increase the voltage value of the output port of the converter circuit to a first ride-through voltage value. Herein, the first ride-through voltage value is greater than the first trigger voltage value. The drive control circuit herein may be configured to: in a process in which the converter circuit outputs the first reactive current to the power grid, when it is detected that the voltage value of the output port of the converter circuit increases to a third working voltage value and the third working voltage value is greater than or equal to a first recovery voltage value, control the converter circuit to output a second reactive current to the power grid, to recover the voltage value of the output port of the converter circuit to the first working voltage value. Herein, the first recovery voltage value is greater than the first ride-through voltage value. When the power supply system transmits electric energy to the power grid, some faults may occur in the power grid (for example, a ground-inductive short circuit occurs in a part of the power grid (for example, some transmission lines or other components)) and consequently, a voltage of the output port of the converter circuit decreases. When the voltage value of the output port of the converter circuit decreases to a value lower than a threshold (for example, the first trigger voltage value), the converter circuit may increase an output reactive current, to increase the voltage value of the output port of the converter circuit to a voltage value (for example, the first ride-through voltage value) that can maintain working of the power grid. In other words, the converter circuit may output the first reactive current to the power grid when the voltage value of the output port of the converter circuit decreases from the first working voltage value to the second working voltage value and the second working voltage value is less than or equal to the first trigger voltage value, to increase the voltage value of the output port of the converter circuit to the first ride-through voltage value, to maintain working of the power grid. Further, if the fault in the power grid is troubleshot (for example, the fault is rectified or the power grid is cut off in a faulty region) or in another case that causes an increase in the voltage value of the output port of the converter circuit, the voltage value of the output port of the converter circuit further increases. When the voltage value of the output port of the converter circuit increases to a value higher than a threshold (for example, the first recovery voltage value), the converter circuit may decrease the output reactive current, to recover the voltage value of the output port of the converter circuit to a voltage value (for example, the first working voltage value) that is of the output port of the converter circuit and that exists before the fault occurs. In other words, in the process in which the converter circuit outputs the first reactive current to the power grid, when it is detected that the voltage value of the output port of the converter circuit increases to the third working voltage value and the third working voltage value is greater than or equal to the first recovery voltage value, the drive control circuit may control the converter circuit to output the second reactive current to the power grid, to recover the voltage value of the output port of the converter circuit to the first working voltage value. Herein, the first recovery voltage value is greater than the first ride-through voltage value, the power supply system may enable a converter to stably output a reactive current in a period in which the power grid is faulty, circuit oscillation decreases, a structure is simple, a control method is simple, and security is high.

With reference to the first aspect, in a first possible implementation, the drive control circuit may be further configured to: in the process in which the converter circuit outputs the first reactive current to the power grid, when it is detected that the voltage value of the output port of the converter circuit is less than the first recovery voltage value and duration in which the converter circuit transmits the first reactive current to the power grid is greater than or equal to first ride-through duration, control the converter circuit to output a third reactive current to the power grid, to recover the voltage value of the output port of the converter circuit to the first working voltage value. In other words, if the fault in the power grid is not troubleshot and a time period in which the converter circuit outputs the first reactive current exceeds a threshold (for example, the first ride-through duration), the drive control circuit may control the converter circuit to output the third reactive current to the power grid, to recover the voltage value of the output port of the converter circuit to the first working voltage value. The drive control circuit may control the duration in which the converter circuit outputs the first reactive current. The control method is simple, security is high, heat generated by the circuit decreases, and a life of a circuit component is prolonged.

With reference to the first aspect or the first possible implementation of the first aspect, in a second possible implementation, the converter circuit may be further configured to output a fourth reactive current to the power grid when the voltage value of the output port of the converter circuit increases from a fourth working voltage value to a fifth working voltage value and the fifth working voltage value is greater than or equal to a second trigger voltage value, to decrease the voltage value of the output port of the converter circuit to a second ride-through voltage value. Herein, the second ride-through voltage value is less than the second trigger voltage value. The drive control circuit herein may be further configured to: in a process in which the converter circuit outputs the fourth reactive current to the power grid, when it is detected that the voltage value of the output port of the converter circuit decreases to a sixth working voltage value and the sixth working voltage value is less than or equal to a second recovery voltage value, control the converter circuit to output a fifth reactive current to the power grid, to recover the voltage value of the output port of the converter circuit to the fourth working voltage value. Herein, the second recovery voltage value is less than the second ride-through voltage value. When the power supply system transmits electric energy to the power grid, some faults may occur in the power grid (for example, a ground-capacitive short circuit occurs in a part of the power grid (for example, some transmission lines or other components)) and consequently, a voltage of the output port of the converter circuit increases. When the voltage value of the output port of the converter circuit increases to a value higher than a threshold (for example, the second trigger voltage value), the converter circuit may decrease an output reactive current, to decrease the voltage value of the output port of the converter circuit to a voltage value (for example, the second ride-through voltage value) that can maintain working of the power grid. In other words, when the voltage value of the output port of the converter circuit increases from the fourth working voltage value to the fifth working voltage value and the fifth working voltage value is greater than or equal to the second trigger voltage value, the converter may output the fourth reactive current to the power grid, to decrease the voltage value of the output port of the converter circuit to the second ride-through voltage value, so as to maintain working of the power grid. Further, if the fault in the power grid is troubleshot (for example, the fault is rectified or the power grid is cut off in a faulty region), the voltage value of the output port of the converter circuit further decreases. When the voltage value of the output port of the converter circuit decreases to a value lower than a threshold (for example, the second recovery voltage value), the converter circuit may increase the output reactive current, to recover the voltage value of the output port of the converter circuit to a voltage value (for example, the fourth working voltage value) that is of the output port of the converter circuit and that exists before the fault occurs. In other words, in the process in which the converter circuit outputs the fourth reactive current to the power grid, when it is detected that the voltage value of the output port of the converter circuit decreases to the sixth working voltage value and the sixth working voltage value is less than or equal to the second recovery voltage value, the drive control circuit may control the converter circuit to output the fifth reactive current to the power grid, to recover the voltage value of the output port of the converter circuit to the fourth working voltage value. Herein, the second recovery voltage value is less than the second ride-through voltage value, the power supply system may enable the converter to stably output a reactive current in a period in which the power grid is faulty, circuit oscillation decreases, a structure is simple, a control method is simple, and security is high.

With reference to the second possible implementation of the first aspect, in a third possible implementation, the drive control circuit may be further configured to: in the process in which the converter circuit outputs the fourth reactive current to the power grid, when it is detected that the voltage value of the output port of the converter circuit is greater than the second recovery voltage value and duration in which the converter circuit transmits the fourth reactive current to the power grid is greater than or equal to second ride-through duration, control the converter circuit to transmit a sixth reactive current to the power grid, to recover the voltage value of the output port of the converter circuit to the fourth working voltage value. In other words, if the fault in the power grid is not troubleshot and a time period in which the converter circuit outputs the first reactive current exceeds a threshold (for example, the second ride-through duration), the drive control circuit may control the converter circuit to output the sixth reactive current to the power grid, to recover the voltage value of the output port of the converter circuit to the fourth working voltage value. The drive control circuit may control the duration in which the converter circuit outputs the fourth reactive current. The control method is simple, security is high, heat generated by the circuit decreases, and a life of a circuit component is prolonged.

With reference to any one of the first aspect to the third possible implementation of the first aspect, in a fourth possible implementation, the power generation apparatus is a photovoltaic power generation apparatus, a wind power generation apparatus, a thermal power generation apparatus, a nuclear power generation apparatus, a chemical power generation apparatus, or a biomass power generation apparatus.

With reference to the fourth possible implementation of the first aspect, in a fifth possible implementation, the power generation apparatus is a photovoltaic power generation apparatus, the power supply system further includes a combiner box, and the power generation apparatus is connected to the converter circuit by using the combiner box.

With reference to the fifth possible implementation of the first aspect, in a sixth possible implementation, the power supply system further includes a direct current bus, the power generation apparatus is connected to the direct current bus by using the combiner box, and the direct current bus is connected to the converter circuit.

With reference to the sixth possible implementation of the first aspect, in a seventh possible implementation, the power supply system further includes a transformer, and the converter circuit is connected to the power grid by using the transformer.

With reference to the seventh possible implementation of the first aspect, in an eighth possible implementation, the power supply system further includes an on/off-grid wiring apparatus, and the transformer is connected to the power grid by using the on/off-grid wiring apparatus.

The power generation apparatus in the power supply system has various representation manners, the power generation apparatus and the converter circuit are connected in a flexible manner, and functional modules in the power supply system have various and flexible combination manners, so that diversity of application scenarios of the power supply system can be improved, and adaptability of the power supply system can be enhanced.

According to a second aspect, an embodiment provides a current conversion method for a power supply system. The method may be applied to the power supply system provided in any one of the first aspect or the possible implementations of the first aspect. In the method, a converter circuit outputs a first reactive current to a power grid when it is detected that a voltage value of an output port of the converter circuit decreases from a first working voltage value to a second working voltage value and the second working voltage value is less than or equal to a first trigger voltage value, to increase the voltage value of the output port of the converter circuit to a first ride-through voltage value. Herein, the first ride-through voltage value is greater than the first trigger voltage value. In a process in which the converter circuit outputs the first reactive current to the power grid, when it is detected that the voltage value of the output port of the converter circuit increases to a third working voltage value and the third working voltage value is greater than or equal to the first recovery voltage value, the drive control circuit controls the converter circuit to output a second reactive current to the power grid, to recover the voltage value of the output port of the converter circuit to the first working voltage value. Herein, the first recovery voltage value is greater than the first ride-through voltage value. When the power supply system transmits electric energy to the power grid, some faults may occur in the power grid (for example, a ground-inductive short circuit occurs in a part of the power grid (for example, some transmission lines or other components)) and consequently, a voltage of the output port of the converter circuit decreases. When the voltage value of the output port of the converter circuit decreases to a value lower than a threshold (for example, the first trigger voltage value), the converter circuit may increase an output reactive current, to increase the voltage value of the output port of the converter circuit to a voltage value (for example, the first ride-through voltage value) that can maintain working of the power grid. In other words, the converter circuit may output the first reactive current to the power grid when the voltage value of the output port of the converter circuit decreases from the first working voltage value to the second working voltage value and the second working voltage value is less than or equal to the first trigger voltage value, to increase the voltage value of the output port of the converter circuit to the first ride-through voltage value, to maintain working of the power grid. Further, if the fault in the power grid is troubleshot (for example, the fault is rectified or the power grid is cut off in a faulty region), the voltage value of the output port of the converter circuit further increases. When the voltage value of the output port of the converter circuit increases to a value higher than a threshold (for example, the first recovery voltage value), the converter circuit may decrease the output reactive current, to recover the voltage value of the output port of the converter circuit to a voltage value (for example, the first working voltage value) that is of the output port of the converter circuit and that exists before the fault occurs. In other words, in the process in which the converter circuit outputs the first reactive current to the power grid, when it is detected that the voltage value of the output port of the converter circuit increases to the third working voltage value and the third working voltage value is greater than or equal to the first recovery voltage value, the drive control circuit may control the converter circuit to output the second reactive current to the power grid, to recover the voltage value of the output port of the converter circuit to the first working voltage value. Herein, the first recovery voltage value is greater than the first ride-through voltage value, the power supply system may enable a converter to stably output a reactive current in a period in which the power grid is faulty, circuit oscillation decreases, a structure is simple, a control method is simple, and security is high.

With reference to the second aspect, in a first possible implementation, the method further includes: in the process in which the converter circuit outputs the first reactive current to the power grid, when it is detected that the voltage value of the output port of the converter circuit is less than the first recovery voltage value and duration in which the converter circuit transmits the first reactive current to the power grid is greater than or equal to first ride-through duration, controlling, by the drive control circuit, the converter circuit to output a third reactive current to the power grid, to recover the voltage value of the output port of the converter circuit to the first working voltage value. In other words, if the fault in the power grid is not troubleshot and a time period in which the converter circuit outputs the first reactive current exceeds a threshold (for example, the first ride-through duration), the drive control circuit may control the converter circuit to output the third reactive current to the power grid, to recover the voltage value of the output port of the converter circuit to the first working voltage value. The drive control circuit may control the duration in which the converter circuit outputs the first reactive current. The control method is simple, security is high, heat generated by the circuit decreases, and a life of a circuit component is prolonged.

With reference to the second aspect or the first possible implementation of the second aspect, in a second possible implementation, the method further includes: outputting, by the converter circuit, a fourth reactive current to the power grid, when it is detected that the voltage value of the output port of the converter circuit increases from the fourth working voltage value to the fifth working voltage value and the fifth working voltage value is greater than or equal to the second trigger voltage value, to decrease the voltage value of the output port of the converter circuit to the second ride-through voltage value. Herein, the second ride-through voltage value is less than the second trigger voltage value. In a process in which the converter circuit outputs the fourth reactive current to the power grid, when it is detected that the voltage value of the output port of the converter circuit decreases to a sixth working voltage value and the sixth working voltage value is less than or equal to the second recovery voltage value, the drive control circuit controls the converter circuit to output a fifth reactive current to the power grid, to recover the voltage value of the output port of the converter circuit to the fourth working voltage value. Herein, the second recovery voltage value is less than the second ride-through voltage value. When the power supply system transmits electric energy to the power grid, some faults may occur in the power grid (for example, a ground-capacitive short circuit occurs in a part of the power grid (for example, some transmission lines or other components)) and consequently, a voltage of the output port of the converter circuit increases. When the voltage value of the output port of the converter circuit increases to a value higher than a threshold (for example, the second trigger voltage value), the converter circuit may decrease an output reactive current, to decrease the voltage value of the output port of the converter circuit to a voltage value (for example, the second ride-through voltage value) that can maintain working of the power grid. In other words, when the voltage value of the output port of the converter circuit increases from the fourth working voltage value to the fifth working voltage value and the fifth working voltage value is greater than or equal to the second trigger voltage value, the converter may output the fourth reactive current to the power grid, to decrease the voltage value of the output port of the converter circuit to the second ride-through voltage value, so as to maintain working of the power grid. Further, if the fault in the power grid is troubleshot (for example, the fault is rectified or the power grid is cut off in a faulty region), the voltage value of the output port of the converter circuit further decreases. When the voltage value of the output port of the converter circuit decreases to a value lower than a threshold (for example, the second recovery voltage value), the converter circuit may increase the output reactive current, to recover the voltage value of the output port of the converter circuit to a voltage value (for example, the fourth working voltage value) that is of the output port of the converter circuit and that exists before the fault occurs. In other words, in the process in which the converter circuit outputs the fourth reactive current to the power grid, when it is detected that the voltage value of the output port of the converter circuit decreases to the sixth working voltage value and the sixth working voltage value is less than or equal to the second recovery voltage value, the drive control circuit may control the converter circuit to output the fifth reactive current to the power grid, to recover the voltage value of the output port of the converter circuit to the fourth working voltage value. Herein, the second recovery voltage value is less than the second ride-through voltage value, the power supply system may enable the converter to stably output a reactive current in a period in which the power grid is faulty, circuit oscillation decreases, a structure is simple, a control method is simple, and security is high.

With reference to the second possible implementation of the second aspect, in a third possible implementation, the method further includes: in the process in which the converter circuit outputs the fourth reactive current to the power grid, when it is detected that the voltage value of the output port of the converter circuit is greater than the second recovery voltage value and duration in which the converter circuit transmits the fourth reactive current to the power grid is greater than or equal to second ride-through duration, controlling, by the drive control circuit, the converter circuit to transmit a sixth reactive current to the power grid, to recover the voltage value of the output port of the converter circuit to the fourth working voltage value. In other words, if the fault in the power grid is not troubleshot and a time period in which the converter circuit outputs the first reactive current exceeds a threshold (for example, the second ride-through duration), the drive control circuit may control the converter circuit to output the sixth reactive current to the power grid, to recover the voltage value of the output port of the converter circuit to the fourth working voltage value. The drive control circuit may control the duration in which the converter circuit outputs the fourth reactive current. The control method is simple, security is high, heat generated by the circuit decreases, and a life of a circuit component is prolonged.

DETAILED DESCRIPTION OF EMBODIMENTS

A power supply system and a current conversion method are applicable to a plurality of application fields such as a new energy smart microgrid field, a power transmission and distribution field, a new energy field (for example, a photovoltaic grid-connected field, a thermal power grid-connected field, or a wind power grid-connected field), a photovoltaic power generation field, a wind power generation field, a thermal power generation field, or a high-power converter field (for example, converting a direct current into a high-power high-voltage alternating current). This may be determined based on an actual application scenario and is not limited herein.

Figure 1:
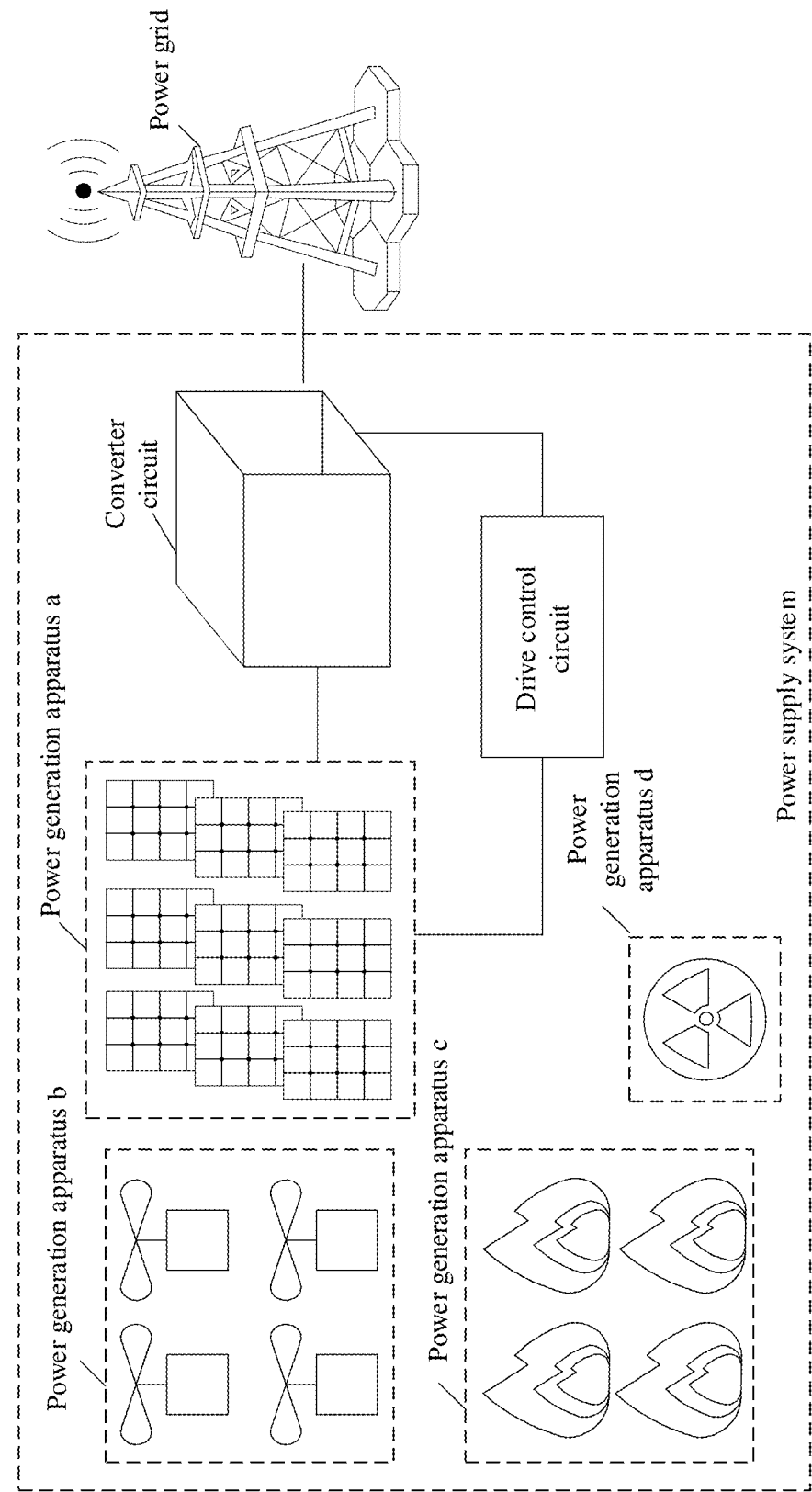
FIG. 1 is a schematic diagram of an application scenario of a power supply system.

The power supply system and the current conversion method may be applied to a power supply system having different power generation apparatuses, for example, a photovoltaic power supply system, a wind power supply system, a thermal power supply system, a nuclear power supply system, a chemical power supply system, or a biomass power supply system. This may be determined based on an actual application scenario and is not limited herein. FIG. 1 is a schematic diagram of an application scenario of a power supply system. As shown in FIG. 1, the power supply system may include a power generation apparatus, a converter circuit, and a drive control circuit. The power generation apparatus may be connected to an input port of the converter circuit, an output port of the converter circuit may be connected to a power grid, and the drive control circuit may be connected to the converter circuit. The power generation apparatus may be a photovoltaic power generation apparatus (a power generation apparatus a shown in FIG. 1), a wind power generation apparatus (a power generation apparatus b shown in FIG. 1), a thermal power generation apparatus (a power generation apparatus c shown in FIG. 1), a nuclear power generation apparatus (a power generation apparatus d shown in FIG. 1), a chemical power generation apparatus (not shown in FIG. 1), or a biomass power generation apparatus (not shown in FIG. 1). For ease of description, the following provides an example description by using a photovoltaic power generation apparatus as an example. The converter circuit and the drive control circuit may be integrated into a converter or another apparatus having a current conversion function (not shown in FIG. 1). When the power supply system runs normally, the converter circuit may adjust an output current, to adjust a voltage value of the output port of the converter circuit to a voltage value that can enable the power grid to work normally, so as to provide, to the power grid, electric energy generated by the power generation apparatus. When the power grid is faulty and consequently, the voltage value of the output port of the converter circuit decreases (or increases) to a threshold, the converter circuit may correspondingly increase (or decrease) an output reactive current, to increase (or decrease) the voltage value of the output port of the converter circuit to a voltage value that can maintain working of the power grid. Subsequently, if a fault in the power grid is troubleshot and the voltage value of the output port of the converter circuit further increases (or decreases) to a threshold, the drive control circuit may control the converter circuit to correspondingly decrease (or increase) an output reactive current, to recover the voltage value of the output port of the converter circuit to the voltage value that can enable the power grid to work normally. Therefore, in the power supply system, a converter can stably output a reactive current in a period in which the power grid is faulty, circuit oscillation decreases, a structure is simple, a control method is simple, and security is high. The power supply system and the current conversion method may be adapted to different application scenarios, for example, a photovoltaic power supply scenario, a wind power supply scenario, a thermal power supply scenario, or another application scenario. The following provides descriptions by using a photovoltaic power supply scenario as an example, and details are not described below.

The following provides, with reference to FIG. 2 to FIG. 8, an example description of the power supply system and the current conversion method.

Figure 2:
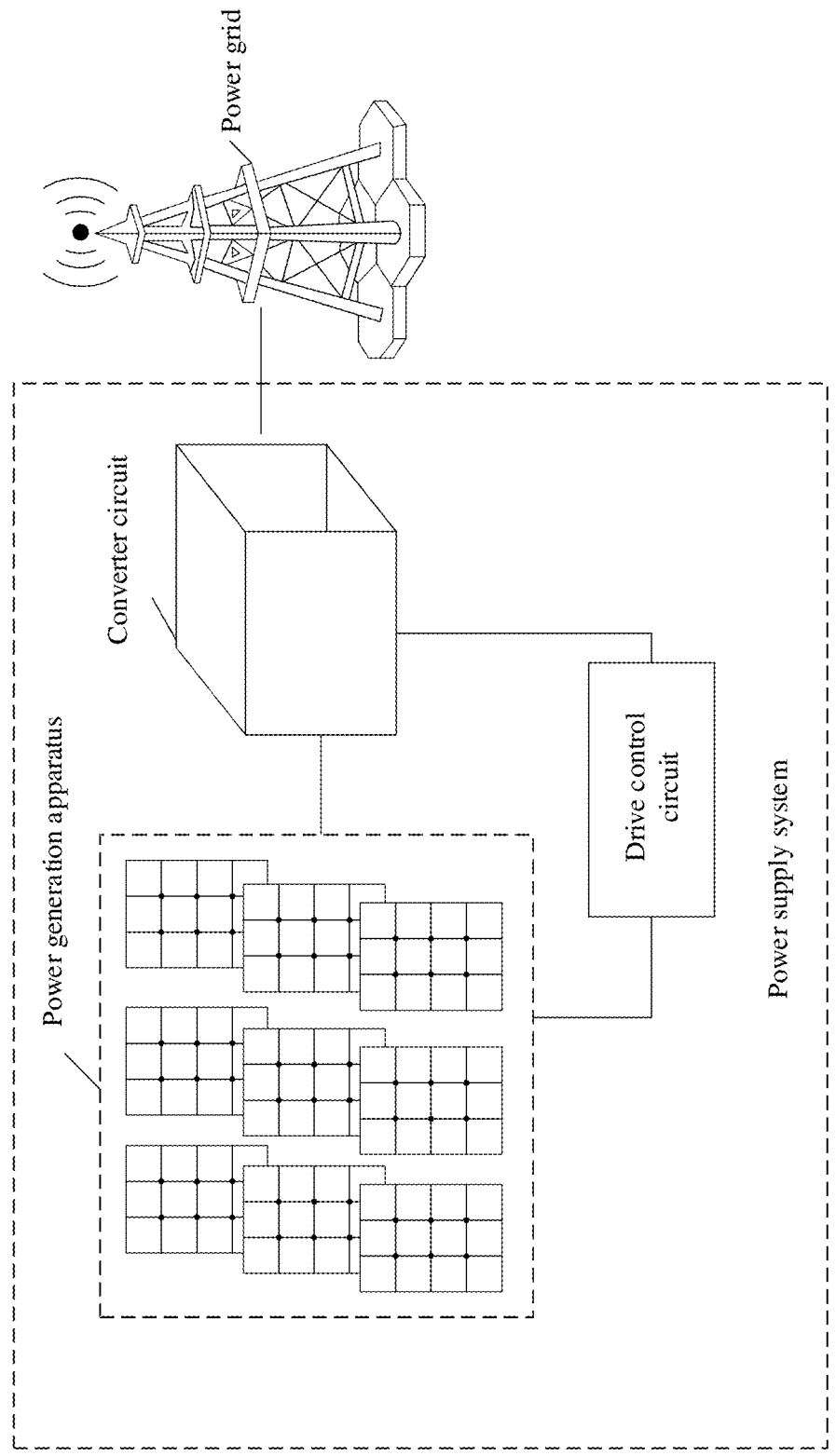
FIG. 2 is a schematic diagram of a structure of a power supply system.

FIG. 2 is a schematic diagram of a structure of a power supply system. In the power supply system shown in FIG. 2, a power generation apparatus may be a photovoltaic power generation apparatus including a photovoltaic array. The photovoltaic array herein may be a photovoltaic module group, one photovoltaic module group may include one or more photovoltaic strings connected in parallel, and one photovoltaic string may be obtained by connecting one or more photovoltaic modules in series. The photovoltaic module herein may be a solar panel, a photovoltaic panel, or the like. In other words, in the power supply system shown in FIG. 2, one photovoltaic string may be a photovoltaic string obtained by connecting one or more solar panels, photovoltaic panels, or energy storage batteries in series. Optionally, the power generation apparatus may alternatively be another photovoltaic power generation apparatus or another apparatus having a power generation function. In other words, in the power supply system shown in FIG. 2, the photovoltaic array may be connected when being required in an actual application scenario. For case of description, the following provides descriptions by using the power supply system shown in FIG. 2 as an example. Details are not described below again. In the power supply system shown in FIG. 2, output currents of a plurality of photovoltaic strings may provide electric energy for a power grid by using a converter circuit and a drive control circuit. The power grid herein may include an electricity-using device or a power transmission device such as a transmission line, a power transfer station, a battery, a communication base station, or a home device.

In the power supply system shown in FIG. 2, the power supply system may include the power generation apparatus, the converter circuit, and the drive control circuit. The power generation apparatus may be connected to an input port of the converter circuit, an output port of the converter circuit may be connected to the power grid, and the drive control circuit may be connected to the converter circuit. When the power supply system runs normally, the converter circuit may adjust an output current, to adjust a voltage value of the output port of the converter circuit to a voltage value that can enable the power grid to work normally, so as to provide, to the power grid, electric energy generated by the power generation apparatus. When the power grid is faulty and consequently, the voltage value of the output port of the converter circuit decreases (or increases) to a threshold, the converter circuit may correspondingly increase (or decrease) an output reactive current, to increase (or decrease) the voltage value of the output port of the converter circuit to a voltage value that can maintain working of the power grid. Subsequently, if a fault in the power grid is troubleshot and the voltage value of the output port of the converter circuit further increases (or decreases) to a threshold (for example, a first recovery voltage value or a second recovery voltage value), the drive control circuit may control the converter circuit to correspondingly decrease (or increase) an output reactive current, to recover the voltage value of the output port of the converter circuit to the voltage value that can enable the power grid to work normally.

Figure 3:
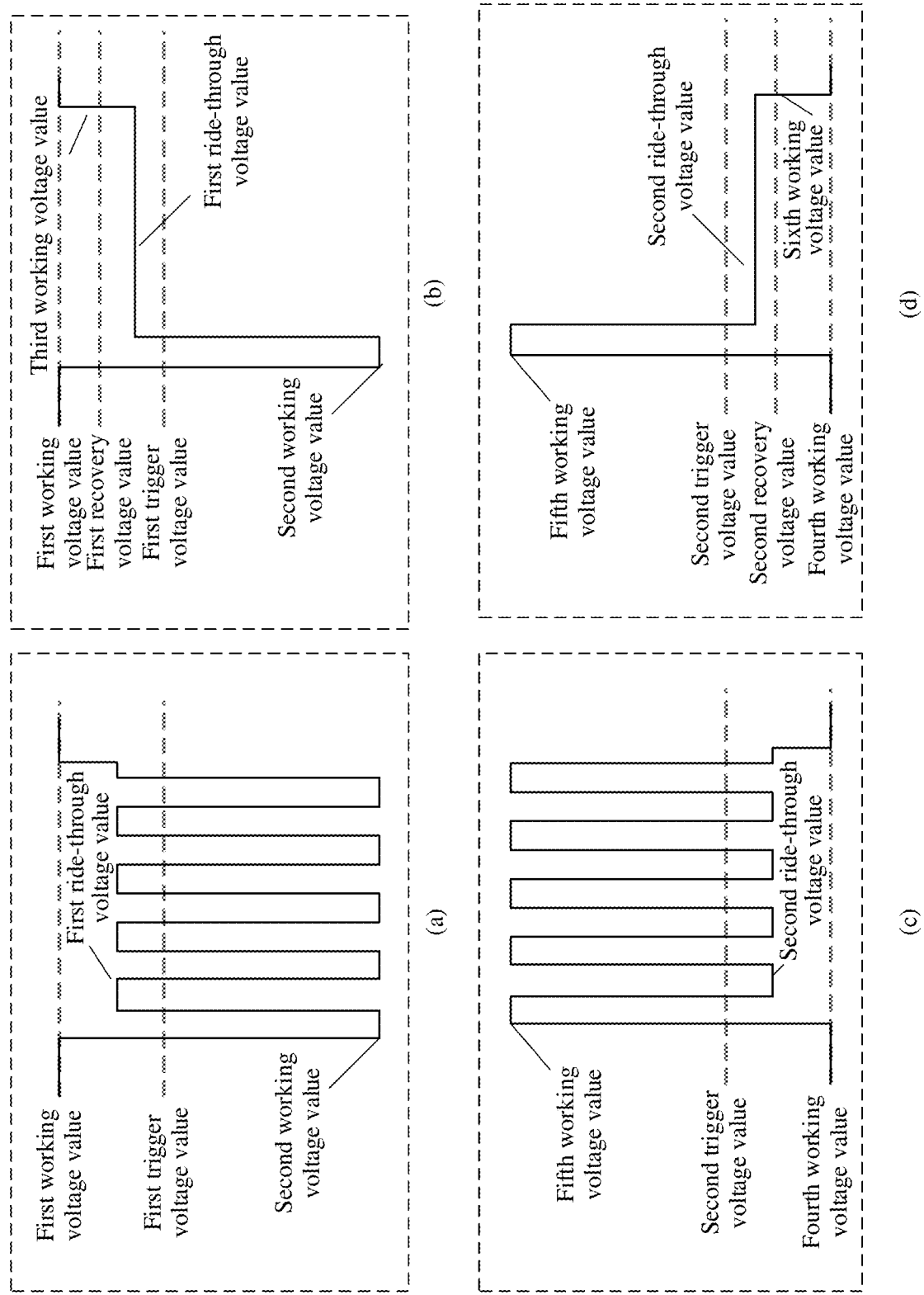
FIG. 3 is a schematic diagram of a voltage waveform of an output port of a converter circuit.

In some implementations, the converter circuit herein may be configured to output a first reactive current to the power grid when the voltage value of the output port of the converter circuit decreases from a first working voltage value to a second working voltage value and the second working voltage value is less than or equal to a first trigger voltage value, to increase the voltage value of the output port of the converter circuit to a first ride-through voltage value. Herein, the first ride-through voltage value is greater than the first trigger voltage value. When the power supply system runs normally, the converter circuit may adjust an output current, to adjust the voltage value of the output port of the converter circuit to the voltage value that can enable the power grid to work normally, so as to provide, to the power grid, the electric energy generated by the power generation apparatus. FIG. 3 is a schematic diagram of a voltage waveform of an output port of a converter circuit. As shown in Part (a) and Part (b) in FIG. 3, when the power grid is faulty (for example, a ground-inductive short circuit occurs in a part of the power grid (for example, some transmission lines or other components)) and consequently, the voltage value of the output port of the converter circuit changes (for example, when the voltage value of the output port of the converter circuit decreases from the first working voltage value to the second working voltage value and the second working voltage value is less than or equal to the first trigger voltage value), the converter circuit may output the first reactive current to the power grid, to increase the voltage value of the output port of the converter circuit to the first ride-through voltage value. In other words, the converter circuit may perform low voltage ride-through, to increase the voltage value of the output port of the converter circuit to the first ride-through voltage value, so as to maintain working of the power grid. Herein, the first ride-through voltage value is greater than the first trigger voltage value. In other words, the converter circuit herein may be configured to output the first reactive current to the power grid when the voltage value of the output port of the converter circuit decreases from the first working voltage value to the second working voltage value and the second working voltage value is less than or equal to the first trigger voltage value, to increase the voltage value of the output port of the converter circuit to the first ride-through voltage value. Herein, the first ride-through voltage value is greater than the first trigger voltage value, the power supply system may enable a converter to stably output a reactive current in a period in which the power grid is faulty, circuit oscillation decreases, a structure is simple, a control method is simple, and security is high. In addition, the system responds to a voltage change of the output port of the converter circuit in a timely manner, flexibility is high, and applicability is high.

If an impedance of the power grid is large, the first ride-through voltage value may be too high and consequently, the converter circuit mistakenly considers that the fault in the power grid is troubleshot and stops low voltage ride-through. However, in fact, the fault in the power grid is not troubleshot, the voltage value of the output port of the converter circuit decreases to a value less than or equal to the first trigger voltage value again, and the converter circuit performs low voltage ride-through again. This is repeated. Consequently, circuit oscillation is caused, and circuit safety is endangered. To avoid this case, in an implementation, the first recovery voltage value may be set.

In some implementations, the drive control circuit herein may be configured to: in a process in which the converter circuit outputs the first reactive current to the power grid, when it is detected that the voltage value of the output port of the converter circuit increases to a third working voltage value and the third working voltage value is greater than or equal to the first recovery voltage value, control the converter circuit to output a second reactive current to the power grid, to recover the voltage value of the output port of the converter circuit to the first working voltage value. Herein, the first recovery voltage value is greater than the first ride-through voltage value. As shown in Part (b) in FIG. 3, the first recovery voltage value herein is greater than the first ride-through voltage value. In the process in which the converter circuit outputs the first reactive current to the power grid, if the fault in the power grid is troubleshot (for example, the fault is rectified or the power grid is cut off in a faulty region), the voltage value of the output port of the converter circuit further increases. When the voltage value of the output port of the converter circuit increases to a value higher than a threshold (for example, the first recovery voltage value), the converter circuit may decrease an output reactive current, to recover the voltage value of the output port of the converter circuit to a voltage value (for example, the first working voltage value) that is of the output port of the converter circuit and that exists before the fault occurs. If the fault in the power grid is troubleshot, the voltage value of the output port of the converter circuit does not fall back again. In other words, the drive control circuit herein may be configured to: in the process in which the converter circuit outputs the first reactive current to the power grid, when it is detected that the voltage value of the output port of the converter circuit increases to the third working voltage value and the third working voltage value is greater than or equal to the first recovery voltage value, control the converter circuit to output a second reactive current to the power grid, to recover the voltage value of the output port of the converter circuit to the first working voltage value. Herein, the first recovery voltage value is greater than the first ride-through voltage value. The first recovery voltage value herein may be a preset value greater than the first ride-through voltage value or may be a value that is set by the converter circuit or the drive control circuit based on a current first ride-through voltage value and that is greater than the first ride-through voltage value. Therefore, the power supply system may enable the converter to stably output the reactive current in the period in which the power grid is faulty, circuit oscillation decreases, a structure is simple, a control method is simple, and security is high. In addition, the system accurately responds to a voltage change of the output port of the converter circuit, an erroneous determining rate is low, and processing efficiency is high.

When the power supply system transmits electric energy to the power grid, some faults may occur in the power grid (for example, a ground-inductive short circuit occurs in a part of the power grid (for example, some transmission lines or other components)) and consequently, a voltage of the output port of the converter circuit decreases. When the voltage value of the output port of the converter circuit decreases to a value lower than a threshold (for example, the first trigger voltage value), the converter circuit may increase an output reactive current (for example, the output first reactive current), to increase the voltage value of the output port of the converter circuit to a voltage value (for example, the first ride-through voltage value) that can maintain working of the power grid. If the fault in the power grid is troubleshot (for example, the fault is rectified or the power grid is cut off in a faulty region), the voltage value of the output port of the converter circuit further increases. When the voltage value of the output port of the converter circuit increases to a value higher than a threshold (for example, the first recovery voltage value), the converter circuit may decrease the output reactive current (for example, the output second reactive current), to recover the voltage value of the output port of the converter circuit to a voltage value (for example, the first working voltage value) that is of the output port of the converter circuit and that exists before the fault occurs. Herein, the first recovery voltage value is greater than the first ride-through voltage value, the power supply system may enable the converter to stably output the reactive current in the period in which the power grid is faulty, circuit oscillation decreases, a structure is simple, a control method is simple, and security is high. In addition, the system accurately responds to a voltage change of the output port of the converter circuit in a timely manner, flexibility is high, applicability is high, an erroneous determining rate is low, and processing efficiency is high.

In some implementations, the drive control circuit may be further configured to: in the process in which the converter circuit outputs the first reactive current to the power grid, when it is detected that the voltage value of the output port of the converter circuit is less than the first recovery voltage value and duration in which the converter circuit transmits the first reactive current to the power grid is greater than or equal to first ride-through duration, control the converter circuit to output a third reactive current to the power grid, to recover the voltage value of the output port of the converter circuit to the first working voltage value. In some cases, a time period in which the power grid is faulty may be too long (for example, exceeding the first ride-through duration), and a fault may need to be manually troubleshot. In this case, the faulty power grid needs to be disconnected, to ensure safety of a maintenance person. In addition, if a troubleshooting time period of the fault in the power grid is too long and the converter circuit keeps outputting the first reactive current, a component in the converter circuit may be overheated or a life of a component may decrease. When the troubleshooting time period of the fault in the power grid is too long, the drive control circuit may be further configured to: in the process in which the converter circuit outputs the first reactive current to the power grid, when it is detected that the voltage value of the output port of the converter circuit is less than the first recovery voltage value and duration in which the converter circuit transmits the first reactive current to the power grid is greater than or equal to the first ride-through duration, control the converter circuit to output the third reactive current to the power grid, to recover the voltage value of the output port of the converter circuit to the first working voltage value. Herein, the first ride-through duration may be user-defined or may be maximum low-voltage ride-through duration specified in a grid connection standard (for example, VDE-AR-N 4120 in Germany and GB/T 37408 in China) of each country or region. Therefore, the drive control circuit may control the duration in which the converter circuit outputs the first reactive current. The control method is simple, security is high, heat generated by the circuit decreases, and a life of a circuit component is prolonged. Flexibility and adaptability of the power supply system are further improved.

If the fault in the power grid is not troubleshot and the time period in which the converter circuit outputs the first reactive current exceeds a threshold (for example, the first ride-through duration), the drive control circuit may control the converter circuit to output the third reactive current to the power grid, to recover the voltage value of the output port of the converter circuit to the first working voltage value. In other words, the drive control circuit may control the duration in which the converter circuit outputs the first reactive current. The control method is simple, security is high, heat generated by the circuit decreases, and a life of a circuit component is prolonged. Flexibility and adaptability of the power supply system are further improved.

In some implementations, the converter circuit may be further configured to output a fourth reactive current to the power grid when the voltage value of the output port of the converter circuit increases from a fourth working voltage value to a fifth working voltage value and the fifth working voltage value is greater than or equal to a second trigger voltage value, to decrease the voltage value of the output port of the converter circuit to a second ride-through voltage value. Herein, the second ride-through voltage value is less than the second trigger voltage value. When the power supply system runs normally, the converter circuit may adjust an output current, to adjust the voltage value of the output port of the converter circuit to the voltage value that can enable the power grid to work normally, so as to provide, to the power grid, the electric energy generated by the power generation apparatus. As shown in Part (c) and Part (d) in FIG. 3, when the power grid is faulty (for example, a ground-capacitive short circuit occurs in a part of the power grid (for example, some transmission lines or other components)) and consequently, the voltage value of the output port of the converter circuit changes (for example, when the voltage value of the output port of the converter circuit increases from the fourth working voltage value to the fifth working voltage value and the fifth working voltage value is greater than or equal to the second trigger voltage value), the converter circuit may output the fourth reactive current to the power grid, to decrease the voltage value of the output port of the converter circuit to the second ride-through voltage value. In other words, the converter circuit may further perform high voltage ride-through, to decrease the voltage value of the output port of the converter circuit to the second ride-through voltage value, so as to maintain working of the power grid. Herein, the second ride-through voltage value is less than the second trigger voltage value. In other words, the converter circuit may be further configured to output the fourth reactive current to the power grid when the voltage value of the output port of the converter circuit increases from the fourth working voltage value to the fifth working voltage value and the fifth working voltage value is greater than or equal to the second trigger voltage value, to decrease the voltage value of the output port of the converter circuit to the second ride-through voltage value. Herein, the second ride-through voltage value is less than the second trigger voltage value.

If an impedance of the power grid is large, the second ride-through voltage value may be too low and consequently, the converter circuit mistakenly considers that the fault in the power grid is troubleshot and stops high voltage ride-through. However, in fact, the fault in the power grid is not troubleshot, the voltage value of the output port of the converter circuit increases to a value greater than or equal to the second trigger voltage value again, and the converter circuit performs high voltage ride-through again. This is repeated. Consequently, circuit oscillation is caused, and circuit safety is endangered. To avoid this case, in an implementation, the second recovery voltage value may be set.

In some implementations, the drive control circuit herein may be further configured to: in a process in which the converter circuit outputs the fourth reactive current to the power grid, when it is detected that the voltage value of the output port of the converter circuit decreases to a sixth working voltage value and the sixth working voltage value is less than or equal to the second recovery voltage value, control the converter circuit to output a fifth reactive current to the power grid, to recover the voltage value of the output port of the converter circuit to the fourth working voltage value. Herein, the second recovery voltage value is less than the second ride-through voltage value. As shown in Part (d) in FIG. 3, the second recovery voltage value herein is less than the second ride-through voltage value. In the process in which the converter circuit outputs the fourth reactive current to the power grid, if the fault in the power grid is troubleshot (for example, the fault is rectified or the power grid is cut off in a faulty region), the voltage value of the output port of the converter circuit further decreases. When the voltage value of the output port of the converter circuit decreases to a value lower than a threshold (for example, the second recovery voltage value), the converter circuit may increase an output reactive current, to recover the voltage value of the output port of the converter circuit to a voltage value (for example, the fourth working voltage value) that is of the output port of the converter circuit and that exists before the fault occurs. If the fault in the power grid is troubleshot, the voltage value of the output port of the converter circuit does not increase again. In other words, the drive control circuit herein may be further configured to: in the process in which the converter circuit outputs the fourth reactive current to the power grid, when it is detected that the voltage value of the output port of the converter circuit decreases to the sixth working voltage value and the sixth working voltage value is less than or equal to the second recovery voltage value, control the converter circuit to output the fifth reactive current to the power grid, to recover the voltage value of the output port of the converter circuit to the fourth working voltage value. Herein, the second recovery voltage value is less than the second ride-through voltage value. The second recovery voltage value herein may be a preset value less than the second ride-through voltage value or may be a value that is set by the converter circuit or the drive control circuit based on a current second ride-through voltage value and that is less than the second ride-through voltage value. Therefore, the power supply system may enable the converter to stably output the reactive current in the period in which the power grid is faulty, circuit oscillation decreases, a structure is simple, a control method is simple, and security is high. In addition, the system accurately responds to a voltage change of the output port of the converter circuit, an erroneous determining rate is low, and processing efficiency is high.

When the power supply system transmits electric energy to the power grid, some faults may occur in the power grid (for example, a ground-capacitive short circuit occurs in a part of the power grid (for example, some transmission lines or other components)) and consequently, a voltage of the output port of the converter circuit increases. When the voltage value of the output port of the converter circuit increases to a value higher than a threshold (for example, the second trigger voltage value), the converter circuit may decrease an output reactive current, to decrease the voltage value of the output port of the converter circuit to a voltage value (for example, the second ride-through voltage value) that can maintain working of the power grid. If the fault in the power grid is troubleshot (for example, the fault is rectified or the power grid is cut off in a faulty region), the voltage value of the output port of the converter circuit further decreases. When the voltage value of the output port of the converter circuit decreases to a value lower than a threshold (for example, the second recovery voltage value), the converter circuit may increase the output reactive current, to recover the voltage value of the output port of the converter circuit to a voltage value (for example, the fourth working voltage value) that is of the output port of the converter circuit and that exists before the fault occurs. Herein, the second recovery voltage value is less than the second ride-through voltage value, the power supply system may enable the converter to stably output the reactive current in the period in which the power grid is faulty, circuit oscillation decreases, a structure is simple, a control method is simple, and security is high. In addition, the system accurately responds to a voltage change of the output port of the converter circuit in a timely manner, flexibility is high, applicability is high, an erroneous determining rate is low, and processing efficiency is high.

In some implementations, the drive control circuit may be further configured to: in the process in which the converter circuit outputs the fourth reactive current to the power grid, when it is detected that the voltage value of the output port of the converter circuit is greater than the second recovery voltage value and duration in which the converter circuit transmits the fourth reactive current to the power grid is greater than or equal to second ride-through duration, control the converter circuit to transmit a sixth reactive current to the power grid, to recover the voltage value of the output port of the converter circuit to the fourth working voltage value. In some cases, a time period in which the power grid is faulty may be too long (for example, exceeding the second ride-through duration), and a fault may need to be manually troubleshot. In this case, the faulty power grid needs to be disconnected, to ensure safety of a maintenance person. In addition, if a troubleshooting time period of the fault in the power grid is too long and the converter circuit keeps outputting the fourth reactive current, a component in the converter circuit may be overheated or a life of a component may decrease. When the troubleshooting time period of the fault in the power grid is too long, the drive control circuit may be further configured to: in the process in which the converter circuit outputs the fourth reactive current to the power grid, when it is detected that the voltage value of the output port of the converter circuit is greater than the second recovery voltage value and duration in which the converter circuit transmits the fourth reactive current to the power grid is greater than or equal to the second ride-through duration, control the converter circuit to output the sixth reactive current to the power grid, to recover the voltage value of the output port of the converter circuit to the fourth working voltage value. Herein, the second ride-through duration may be manually specified or may be maximum high-voltage ride-through duration specified in a grid connection standard of each country or region. Therefore, the drive control circuit may control the duration in which the converter circuit outputs the fourth reactive current. The control method is simple, security is high, heat generated by the circuit decreases, and a life of a circuit component is prolonged. Flexibility and adaptability of the power supply system are further improved.

If the fault in the power grid is not troubleshot and the time period in which the converter circuit outputs the first reactive current exceeds a threshold (for example, the second ride-through duration), the drive control circuit may control the converter circuit to output the sixth reactive current to the power grid, to recover the voltage value of the output port of the converter circuit to the fourth working voltage value. In other words, the drive control circuit may control the duration in which the converter circuit outputs the fourth reactive current. The control method is simple, security is high, heat generated by the circuit decreases, and a life of a circuit component is prolonged. Flexibility and adaptability of the power supply system are further improved.

When the power supply system runs normally, the converter circuit may adjust the output current, to adjust the voltage value of the output port of the converter circuit to the voltage value (for example, the first working voltage value or the fourth working voltage value) that can enable the power grid to work normally, so as to provide, to the power grid, electric energy generated by the power generation apparatus. When the power grid is faulty and consequently, the voltage value of the output port of the converter circuit decreases (or increases) to a threshold (for example, the first trigger voltage value or the second trigger voltage value), the converter circuit may correspondingly increase (or decrease) an output reactive current, to increase (or decrease) the voltage value of the output port of the converter circuit to a voltage value (for example, the first ride-through voltage value or the second ride-through voltage value) that can maintain working of the power grid. Subsequently, if a fault in the power grid is troubleshot and the voltage value of the output port of the converter circuit further increases (or decreases) to a threshold (for example, the first recovery voltage value or the second recovery voltage value), the drive control circuit may control the converter circuit to correspondingly decrease (or increase) an output reactive current, to recover the voltage value of the output port of the converter circuit to the voltage value (for example, the first working voltage value or the fourth working voltage value) that can enable the power grid to work normally. Therefore, in the power supply system, a converter can stably output a reactive current in a period in which the power grid is faulty, circuit oscillation decreases, a structure is simple, a control method is simple, and security is high.

Figure 4:
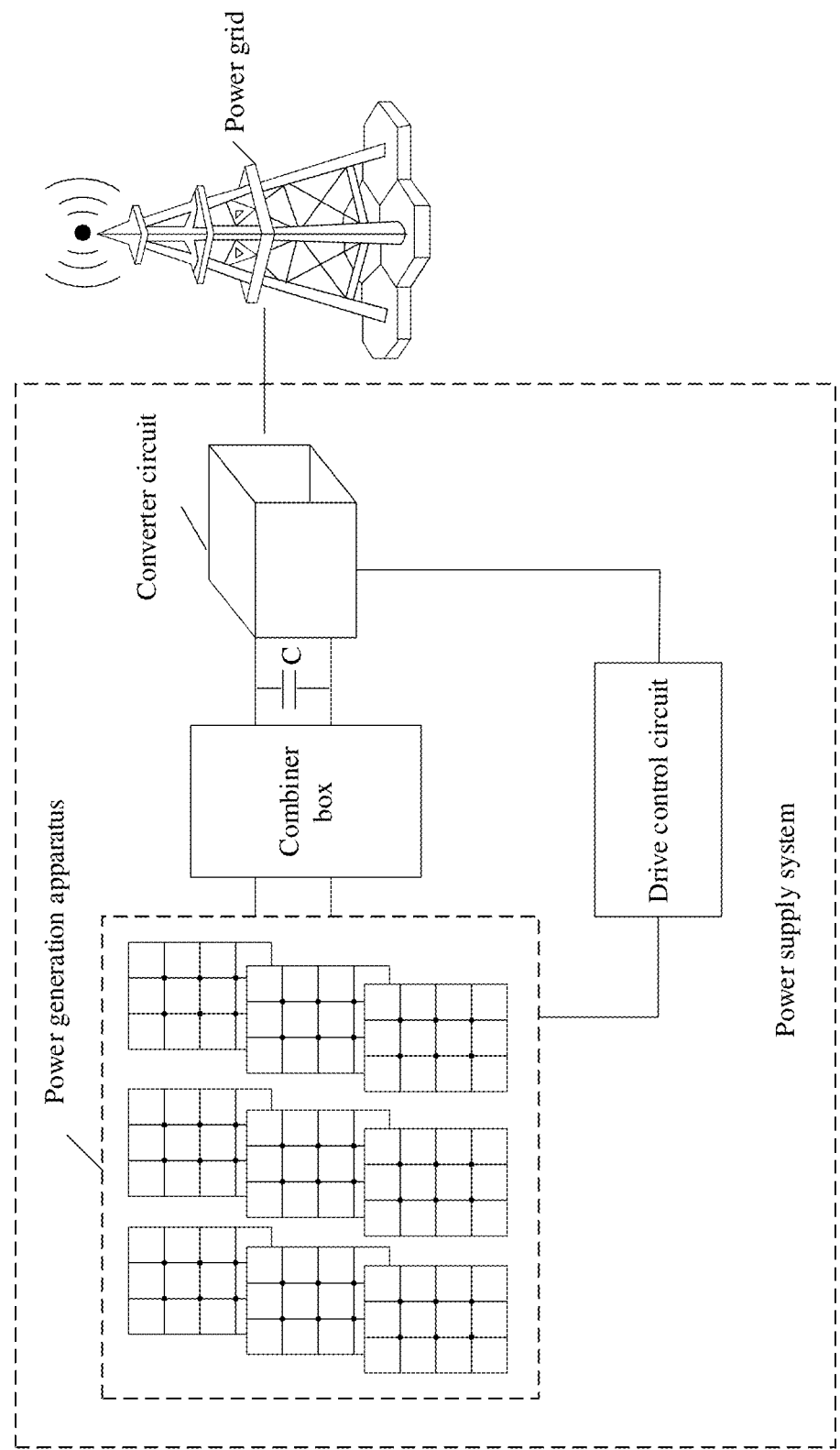
FIG. 4 is a schematic diagram of another structure of a power supply system.

FIG. 4 is a schematic diagram of another structure of a power supply system. The power supply system shown in FIG. 4 may further include a direct current bus, and a power generation apparatus may be connected to a load by using the direct current bus and a converter circuit. Herein, the direct current bus may include one bus capacitor or a plurality of bus capacitors connected in series to each other and may be configured to store energy. For example, as shown in FIG. 4, the direct current bus includes a bus capacitor C. In the power supply system shown in FIG. 4, the converter circuit may convert electric energy that is output by a power generation apparatus and that is stored at two ports of the bus capacitor C and output a corresponding current and voltage to maintain working of a power grid. Optionally, in some implementations, as shown in FIG. 4, the power supply system may further include a combiner box, and a plurality of photovoltaic strings in the power generation apparatus may be connected in parallel to the combiner box and are connected to the direct current bus and/or the converter circuit by using the combiner box. The plurality of photovoltaic strings in the power generation apparatus may be connected in parallel to the combiner box and then directly connected to the converter circuit by using the combiner box or may be connected to the direct current bus by using the combiner box and connected to the converter circuit by using the direct current bus. This may be set based on an actual application scenario and is not limited herein.

Figure 5:
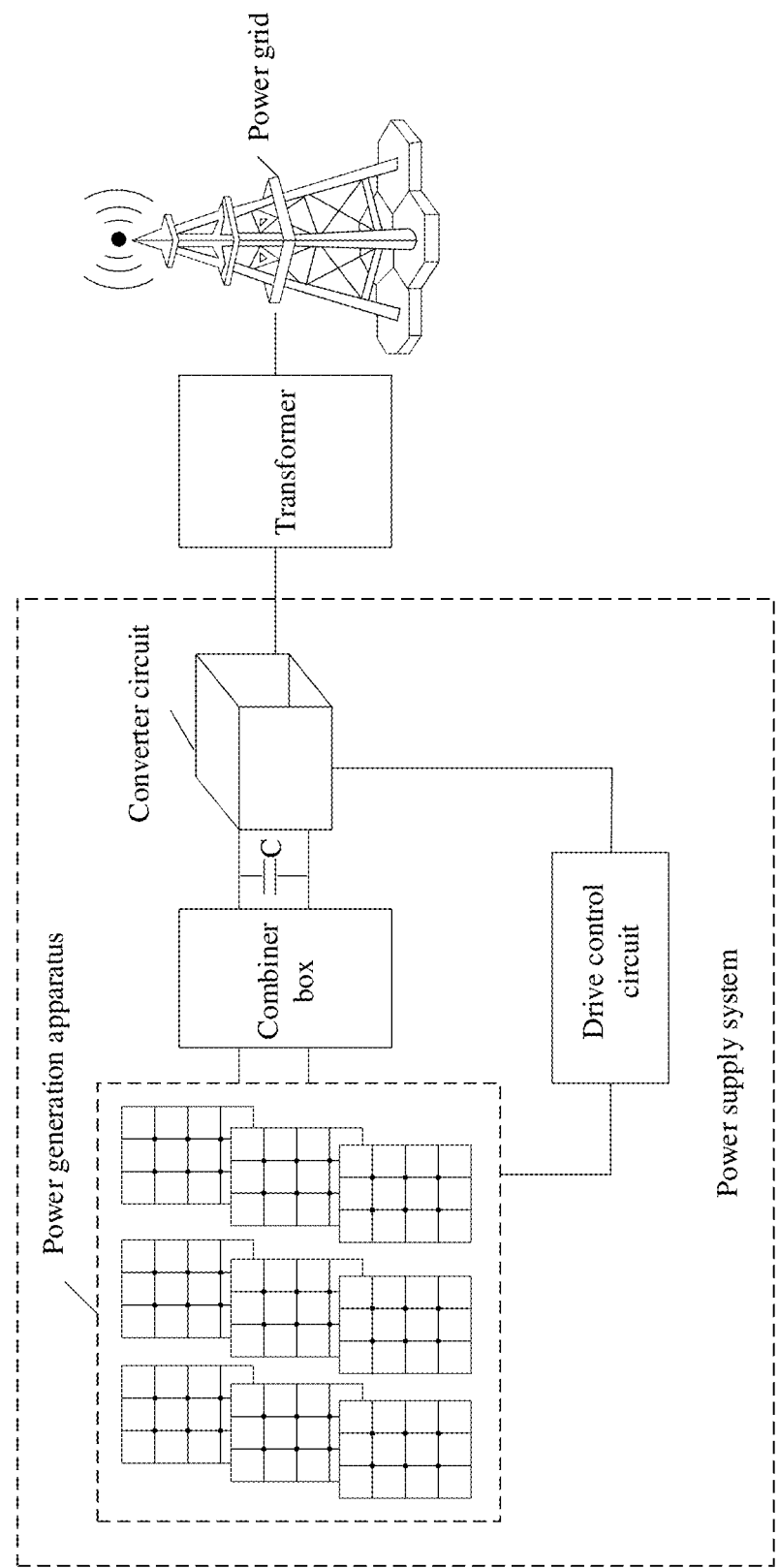
FIG. 5 is a schematic diagram of another structure of a power supply system.

FIG. 5 is a schematic diagram of another structure of a power supply system. In the power supply system shown in FIG. 5, a power generation apparatus may be connected to a direct current bus by using a combiner box and connected to a converter circuit by using the direct current bus, and the converter circuit is connected to a power grid by using a transformer. In other words, output currents of a plurality of photovoltaic strings in the power generation apparatus may be combined by using the combiner box (that is, the plurality of photovoltaic strings are connected in parallel to the combiner box), to provide an input voltage for the converter circuit. The converter circuit may convert electric energy that is output by the power generation apparatus and that is stored at two ports of a bus capacitor C (for example, convert direct current energy into alternating current energy, and preliminarily boost a voltage), and output a corresponding current and voltage to the transformer. The transformer may further boost the voltage and transmit the voltage to the power grid, to maintain working of the power grid.

Figure 6:
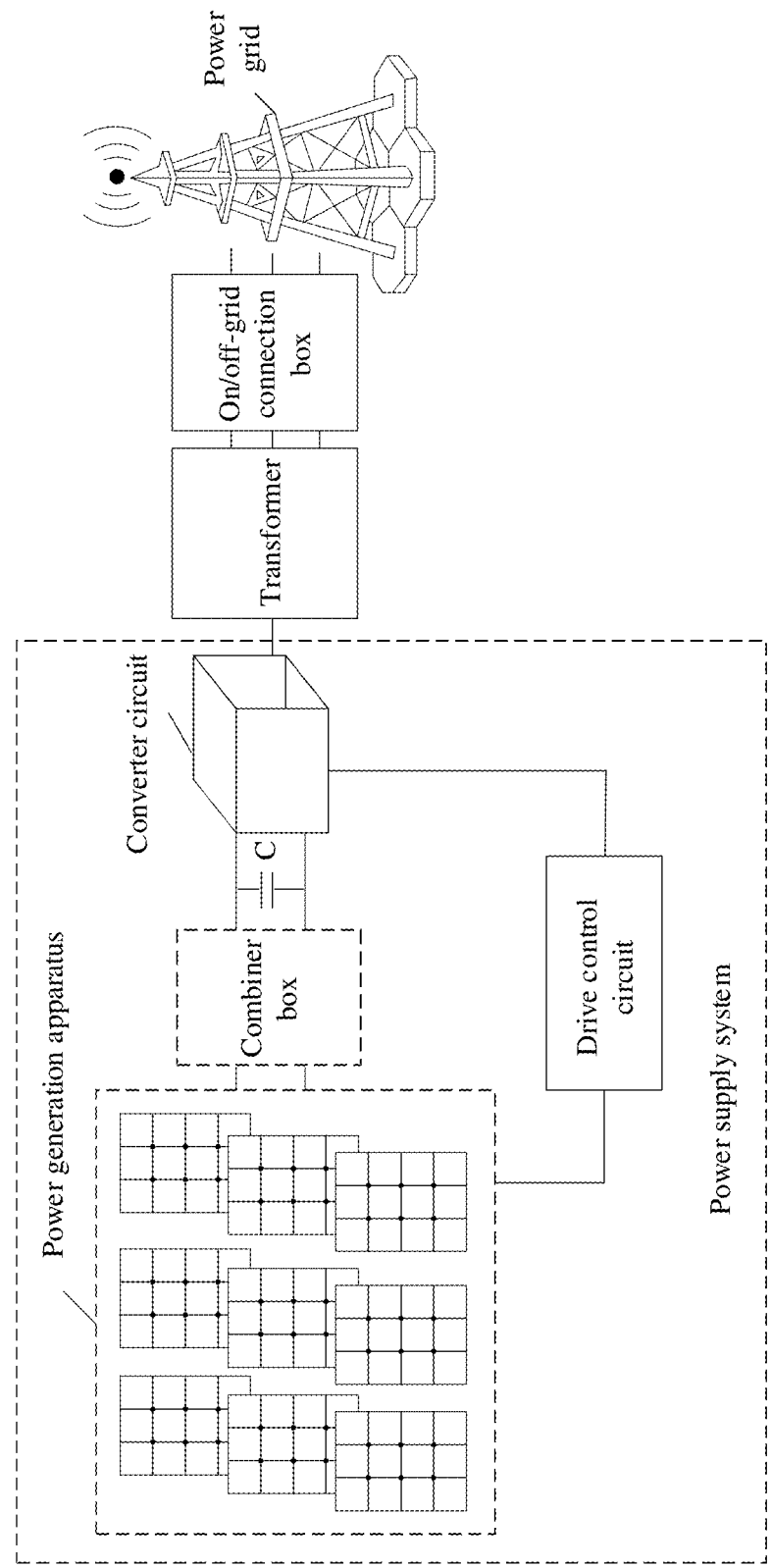
FIG. 6 is a schematic diagram of another structure of a power supply system.

FIG. 6 is a schematic diagram of another structure of a power supply system. As shown in FIG. 6, a load of the power supply system may further include an on/off-grid connection box, and a converter circuit may supply power to an electricity-using device or a power transmission device such as a transmission line, a power transfer station, a battery, a communication base station, or a home device in a power grid by using the on/off-grid connection box.

The power generation apparatus in the power supply system has various representation manners, the power generation apparatus and the converter circuit are connected in a flexible manner, and functional modules in the power supply system have various and flexible combination manners, so that diversity of application scenarios of the power supply system can be improved, and adaptability of the power supply system can be enhanced. In addition, in any one of the power supply systems shown in FIG. 1 to FIG. 6, the power supply system may enable the converter to stably output a reactive current in a period in which the power grid is faulty, circuit oscillation decreases, a structure is simple, a control method is simple, and security is high. For ease of description, the following provides, by using the structure of the power supply system shown in FIG. 2, an example description of a current conversion method for a power supply system provided in an embodiment.

Figure 7:
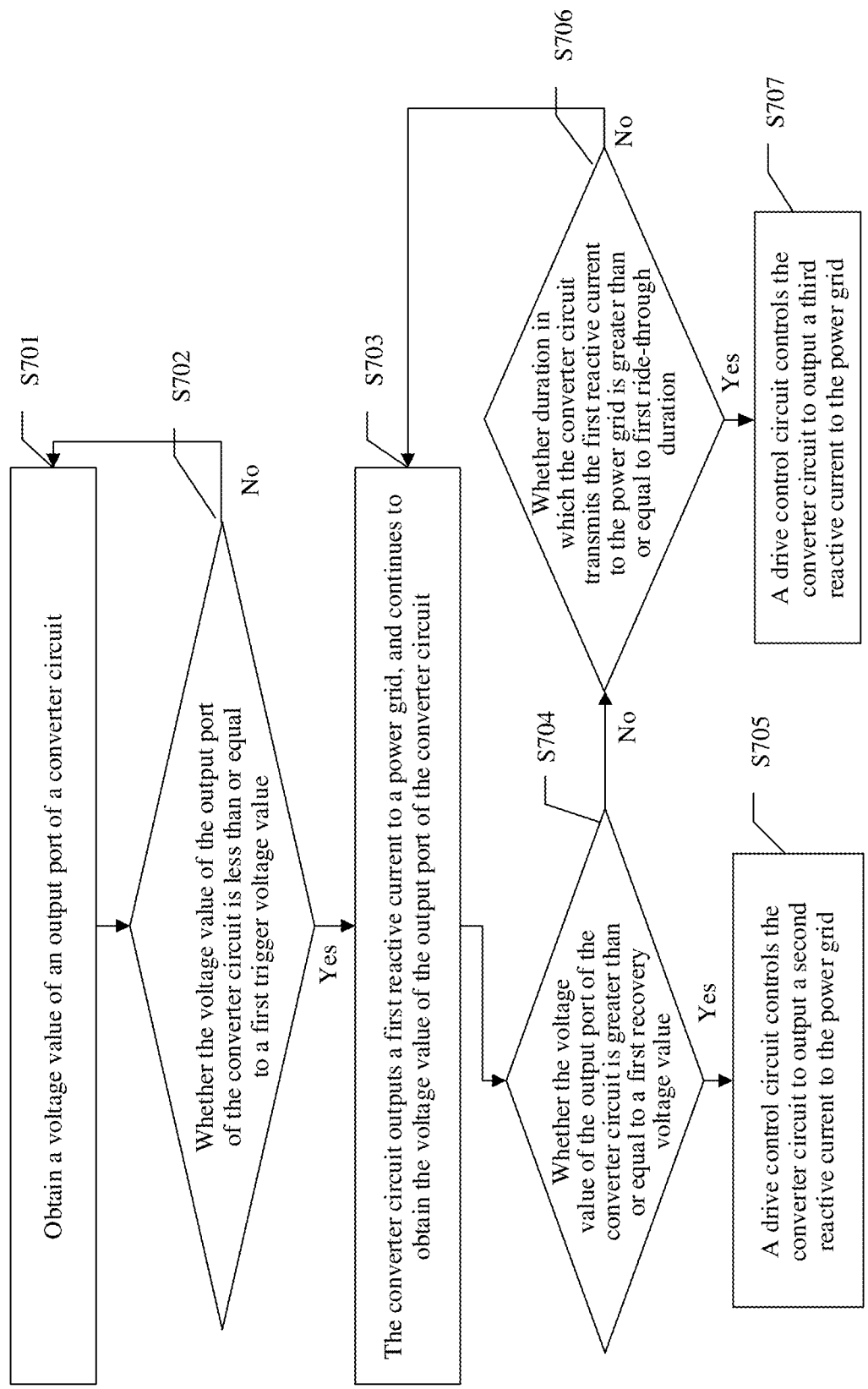
FIG. 7 is a schematic flowchart of a current conversion method for a power supply system.

FIG. 7 is a schematic flowchart of a current conversion method for a power supply system. The current conversion method for a power supply system is applicable to any power supply system shown in FIG. 1 to FIG. 6. As shown in FIG. 7, the current conversion method for a power supply system includes the following steps.

S701: Obtain a voltage value of an output port of a converter circuit.

S702: Determine whether the voltage value of the output port of the converter circuit is less than or equal to a first trigger voltage value; and perform step S703 if a determining result is that the voltage value of the output port of the converter circuit is less than or equal to the first trigger voltage value; or perform step S701 if a determining result is that the voltage value of the output port of the converter circuit is not less than or equal to the first trigger voltage value.

S703: The converter circuit outputs a first reactive current to a power grid and continues to obtain the voltage value of the output port of the converter circuit.

In some implementations, the converter circuit outputs the first reactive current to the power grid when it is detected that the voltage value of the output port of the converter circuit decreases from a first working voltage value to a second working voltage value and the second working voltage value is less than or equal to the first trigger voltage value, to increase the voltage value of the output port of the converter circuit to a first ride-through voltage value. Herein, the first ride-through voltage value is greater than the first trigger voltage value. When the power supply system transmits electric energy to the power grid, some faults may occur in the power grid (for example, a ground-inductive short circuit occurs in a part of the power grid (for example, some transmission lines or other components)) and consequently, a voltage of the output port of the converter circuit decreases. When the voltage value of the output port of the converter circuit decreases to a value lower than a threshold (for example, the first trigger voltage value), the converter circuit may increase an output reactive current, to increase the voltage value of the output port of the converter circuit to a voltage value (for example, the first ride-through voltage value) that can maintain working of the power grid. In other words, the converter circuit may output the first reactive current to the power grid when the voltage value of the output port of the converter circuit decreases from the first working voltage value to the second working voltage value and the second working voltage value is less than or equal to the first trigger voltage value, to increase the voltage value of the output port of the converter circuit to the first ride-through voltage value, to maintain working of the power grid.

S704: Determine whether the voltage value of the output port of the converter circuit is greater than or equal to a first recovery voltage value; and perform step S705 if a determining result is that the voltage value of the output port of the converter circuit is greater than or equal to the first recovery voltage value; or perform step S706 if a determining result is that the voltage value of the output port of the converter circuit is not greater than or equal to the first recovery voltage value.

S705: A drive control circuit controls the converter circuit to output a second reactive current to the power grid.

In some implementations, in a process in which the converter circuit outputs the first reactive current to the power grid, when it is detected that the voltage value of the output port of the converter circuit increases to a third working voltage value and the third working voltage value is greater than or equal to the first recovery voltage value, the drive control circuit controls the converter circuit to output a second reactive current to the power grid, to recover the voltage value of the output port of the converter circuit to the first working voltage value. Herein, the first recovery voltage value is greater than the first ride-through voltage value. If a fault in the power grid is troubleshot (for example, the fault is rectified or the power grid is cut off in a faulty region), the voltage value of the output port of the converter circuit further increases. When the voltage value of the output port of the converter circuit increases to a value higher than a threshold (for example, the first recovery voltage value), the converter circuit may decrease an output reactive current, to recover the voltage value of the output port of the converter circuit to a voltage value (for example, the first working voltage value) that is of the output port of the converter circuit and that exists before the fault occurs. In other words, in the process in which the converter circuit outputs the first reactive current to the power grid, when it is detected that the voltage value of the output port of the converter circuit increases to the third working voltage value and the third working voltage value is greater than or equal to the first recovery voltage value, the drive control circuit may control the converter circuit to output the second reactive current to the power grid, to recover the voltage value of the output port of the converter circuit to the first working voltage value. Herein, the first recovery voltage value is greater than the first ride-through voltage value, the power supply system may enable a converter to stably output a reactive current in a period in which the power grid is faulty, circuit oscillation decreases, a structure is simple, a control method is simple, and security is high.

S706: Determine whether duration in which the converter circuit transmits the first reactive current to the power grid is greater than or equal to the first ride-through duration; and perform step S707 if a determining result is that the duration in which the converter circuit transmits the first reactive current to the power grid is greater than or equal to the first ride-through duration; or perform step S703 if a determining result is that the duration in which the converter circuit transmits the first reactive current to the power grid is not greater than or equal to the first ride-through duration.

S707: A drive control circuit controls the converter circuit to output a third reactive current to the power grid.

In some implementations, a time period in which the power grid is faulty may be too long (for example, exceeding the first ride-through duration), and a fault may need to be manually troubleshot. In this case, the faulty power grid needs to be disconnected, to ensure safety of a maintenance person. In addition, when a troubleshooting time period of the fault in the power grid is too long, if the converter circuit keeps outputting the first reactive current, a component in the converter circuit may be overheated or a life of a component may decrease. When the troubleshooting time period of the fault in the power grid is too long, the drive control circuit may be further configured to: in the process in which the converter circuit outputs the first reactive current to the power grid, when it is detected that the voltage value of the output port of the converter circuit is less than the first recovery voltage value and duration in which the converter circuit transmits the first reactive current to the power grid is greater than or equal to the first ride-through duration, control the converter circuit to output the third reactive current to the power grid, to recover the voltage value of the output port of the converter circuit to the first working voltage value. In other words, if the fault in the power grid is not troubleshot and a time period in which the converter circuit outputs the first reactive current exceeds a threshold (for example, the first ride-through duration), the drive control circuit may control the converter circuit to output the third reactive current to the power grid, to recover the voltage value of the output port of the converter circuit to the first working voltage value. Therefore, the drive control circuit may control the duration in which the converter circuit outputs the first reactive current. The control method is simple, security is high, heat generated by the circuit decreases, and a life of a circuit component is prolonged.

When the power supply system transmits electric energy to the power grid, some faults may occur in the power grid (for example, a ground-inductive short circuit occurs in a part of the power grid (for example, some transmission lines or other components)) and consequently, a voltage of the output port of the converter circuit decreases. When the voltage value of the output port of the converter circuit decreases to a value lower than a threshold (for example, the first trigger voltage value), the converter circuit may increase an output reactive current (for example, the output first reactive current), to increase the voltage value of the output port of the converter circuit to a voltage value (for example, the first ride-through voltage value) that can maintain working of the power grid. If the fault in the power grid is troubleshot (for example, the fault is rectified or the power grid is cut off in a faulty region), the voltage value of the output port of the converter circuit further increases. When the voltage value of the output port of the converter circuit increases to a value higher than a threshold (for example, the first recovery voltage value), the converter circuit may decrease the output reactive current (for example, the output second reactive current), to recover the voltage value of the output port of the converter circuit to a voltage value (for example, the first working voltage value) that is of the output port of the converter circuit and that exists before the fault occurs. Herein, the first recovery voltage value is greater than the first ride-through voltage value, the power supply system may enable a converter to stably output a reactive current in a period in which the power grid is faulty, circuit oscillation decreases, a structure is simple, a control method is simple, and security is high.

Figure 8:
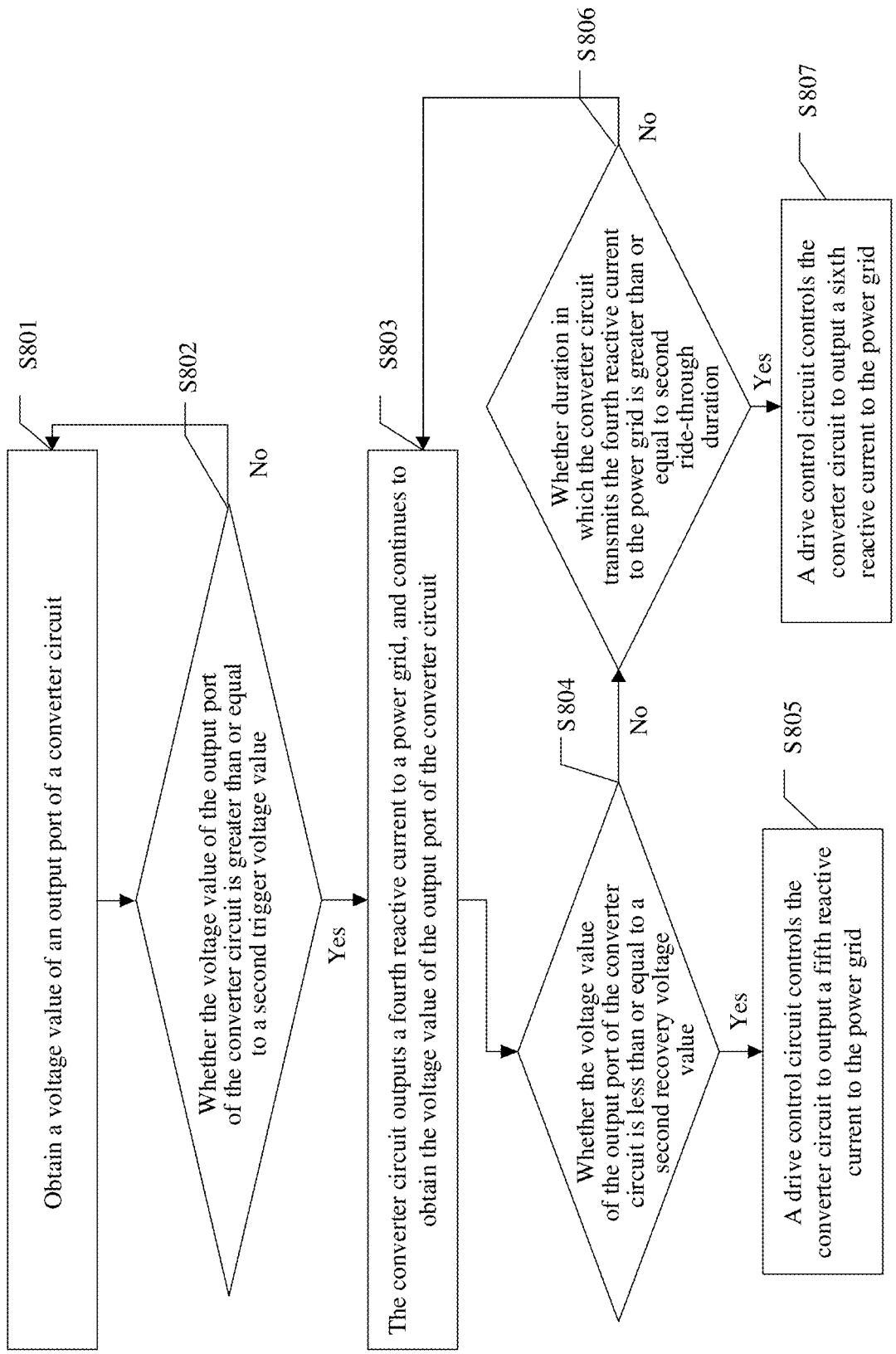
FIG. 8 is another schematic flowchart of a current conversion method for a power supply system.

FIG. 8 is another schematic flowchart of a current conversion method for a power supply system. The current conversion method for a power supply system is applicable to any power supply system shown in FIG. 1 to FIG. 6. As shown in FIG. 8, the current conversion method for a power supply system includes the following steps.

S801: Obtain a voltage value of an output port of a converter circuit.

S802: Determine whether the voltage value of the output port of the converter circuit is greater than or equal to a second trigger voltage value; and perform step S803 if a determining result is that the voltage value of the output port of the converter circuit is greater than or equal to the second trigger voltage value; or perform step S801 if a determining result is that the voltage value of the output port of the converter circuit is not greater than or equal to the second trigger voltage value.

S803: The converter circuit outputs a fourth reactive current to a power grid and continues to obtain the voltage value of the output port of the converter circuit.

In some implementations, the converter circuit outputs the fourth reactive current to the power grid when it is detected that the voltage value of the output port of the converter circuit increases from a fourth working voltage value to a fifth working voltage value and the fifth working voltage value is greater than or equal to the second trigger voltage value, to decrease the voltage value of the output port of the converter circuit to a second ride-through voltage value. Herein, the second ride-through voltage value is less than the second trigger voltage value. When the power supply system transmits electric energy to the power grid, some faults may occur in the power grid (for example, a ground-capacitive short circuit occurs in a part of the power grid (for example, some transmission lines or other components)) and consequently, a voltage of the output port of the converter circuit increases. When the voltage value of the output port of the converter circuit increases to a value higher than a threshold (for example, the second trigger voltage value), the converter circuit may decrease an output reactive current, to decrease the voltage value of the output port of the converter circuit to a voltage value (for example, the second ride-through voltage value) that can maintain working of the power grid. In other words, when the voltage value of the output port of the converter circuit increases from the fourth working voltage value to the fifth working voltage value and the fifth working voltage value is greater than or equal to the second trigger voltage value, the converter may output the fourth reactive current to the power grid, to decrease the voltage value of the output port of the converter circuit to the second ride-through voltage value, so as to maintain working of the power grid.

S804: Determine whether the voltage value of the output port of the converter circuit is less than or equal to a second recovery voltage value; and perform step S805 if a determining result is that the voltage value of the output port of the converter circuit is less than or equal to the second recovery voltage value; or perform step S806 if a determining result is that the voltage value of the output port of the converter circuit is not less than or equal to the second recovery voltage value.

S805: A drive control circuit controls the converter circuit to output a fifth reactive current to the power grid.

In some implementations, in a process in which the converter circuit outputs the fourth reactive current to the power grid, when it is detected that the voltage value of the output port of the converter circuit decreases to a sixth working voltage value and the sixth working voltage value is less than or equal to the second recovery voltage value, the drive control circuit controls the converter circuit to output a fifth reactive current to the power grid, to recover the voltage value of the output port of the converter circuit to the fourth working voltage value. Herein, the second recovery voltage value is less than the second ride-through voltage value. If the fault in the power grid is troubleshot (for example, the fault is rectified or the power grid is cut off in a faulty region), the voltage value of the output port of the converter circuit further decreases. When the voltage value of the output port of the converter circuit decreases to a value lower than a threshold (for example, the second recovery voltage value), the converter circuit may increase the output reactive current, to recover the voltage value of the output port of the converter circuit to a voltage value (for example, the fourth working voltage value) that is of the output port of the converter circuit and that exists before the fault occurs. In other words, in the process in which the converter circuit outputs the fourth reactive current to the power grid, when it is detected that the voltage value of the output port of the converter circuit decreases to the sixth working voltage value and the sixth working voltage value is less than or equal to the second recovery voltage value, the drive control circuit may control the converter circuit to output the fifth reactive current to the power grid, to recover the voltage value of the output port of the converter circuit to the fourth working voltage value. Herein, the second recovery voltage value is less than the second ride-through voltage value, the power supply system may enable the converter to stably output a reactive current in a period in which the power grid is faulty, circuit oscillation decreases, a structure is simple, a control method is simple, and security is high.

S806: Determine whether duration in which the converter circuit transmits the fourth reactive current to the power grid is greater than or equal to the second ride-through duration; and perform step S807 if a determining result is that the duration in which the converter circuit transmits the fourth reactive current to the power grid is greater than or equal to the second ride-through duration; or perform step S803 if a determining result is that the duration in which the converter circuit transmits the fourth reactive current to the power grid is not greater than or equal to the second ride-through duration.

S807: A drive control circuit controls the converter circuit to output a sixth reactive current to the power grid.

In some implementations, a time period in which the power grid is faulty may be too long (for example, exceeding the second ride-through duration), and a fault may need to be manually troubleshot. In this case, the faulty power grid needs to be disconnected, to ensure safety of a maintenance person. In addition, if a troubleshooting time period of the fault in the power grid is too long and the converter circuit keeps outputting the fourth reactive current, a component in the converter circuit may be overheated or a life of a component may decrease. When the troubleshooting time period of the fault in the power grid is too long, the drive control circuit may be further configured to: in the process in which the converter circuit outputs the fourth reactive current to the power grid, when it is detected that the voltage value of the output port of the converter circuit is greater than the second recovery voltage value and duration in which the converter circuit transmits the fourth reactive current to the power grid is greater than or equal to the second ride-through duration, control the converter circuit to output the sixth reactive current to the power grid, to recover the voltage value of the output port of the converter circuit to the fourth working voltage value. In other words, if the fault in the power grid is not troubleshot and a time period in which the converter circuit outputs the first reactive current exceeds a threshold (for example, the second ride-through duration), the drive control circuit may control the converter circuit to output the sixth reactive current to the power grid, to recover the voltage value of the output port of the converter circuit to the fourth working voltage value. Therefore, the drive control circuit may control the duration in which the converter circuit outputs the fourth reactive current. The control method is simple, security is high, heat generated by the circuit decreases, and a life of a circuit component is prolonged.

When the power supply system transmits electric energy to the power grid, some faults may occur in the power grid (for example, a ground-capacitive short circuit occurs in a part of the power grid (for example, some transmission lines or other components)) and consequently, a voltage of the output port of the converter circuit increases. When the voltage value of the output port of the converter circuit increases to a value higher than a threshold (for example, the second trigger voltage value), the converter circuit may decrease an output reactive current, to decrease the voltage value of the output port of the converter circuit to a voltage value (for example, the second ride-through voltage value) that can maintain working of the power grid. If the fault in the power grid is troubleshot (for example, the fault is rectified or the power grid is cut off in a faulty region), the voltage value of the output port of the converter circuit further decreases. When the voltage value of the output port of the converter circuit decreases to a value lower than a threshold (for example, the second recovery voltage value), the converter circuit may increase the output reactive current, to recover the voltage value of the output port of the converter circuit to a voltage value (for example, the fourth working voltage value) that is of the output port of the converter circuit and that exists before the fault occurs. Herein, the second recovery voltage value is less than the second ride-through voltage value, the power supply system may enable the converter to stably output a reactive current in a period in which the power grid is faulty, circuit oscillation decreases, a structure is simple, a control method is simple, and security is high.

When the power supply system runs normally, the converter circuit may adjust an output current, to adjust a voltage value of the output port of the converter circuit to a voltage value that can enable the power grid to work normally, so as to provide, to the power grid, electric energy generated by the power generation apparatus. When the power grid is faulty and consequently, the voltage value of the output port of the converter circuit decreases (or increases) to a threshold, the converter circuit may correspondingly increase (or decrease) an output reactive current, to increase (or decrease) the voltage value of the output port of the converter circuit to a voltage value that can maintain working of the power grid. Subsequently, if a fault in the power grid is troubleshot and the voltage value of the output port of the converter circuit further increases (or decreases) to a threshold, the drive control circuit may control the converter circuit to correspondingly decrease (or increase) an output reactive current, to recover the voltage value of the output port of the converter circuit to the voltage value that can enable the power grid to work normally. Therefore, in the power supply system, a converter can stably output a reactive current in a period in which the power grid is faulty, circuit oscillation decreases, a structure is simple, a control method is simple, and security is high.

The foregoing descriptions are merely implementations, but are not intended to limit the scope of the embodiments. Any variation or replacement readily figured out by a person skilled in the art shall fall within the scope of the embodiments.

What is claimed is:

1. A power supply system comprising:
   a power generation apparatus;
   a converter circuit; and
   a drive control circuit, wherein the power generation apparatus is connected to an input port of the converter circuit, an output port of the converter circuit is connected to a power grid, the drive control circuit is connected to the converter circuit, the converter circuit is configured to:
   output a first reactive current to the power grid when a voltage value of the output port of the converter circuit decreases from a first working voltage value to a second working voltage value and the second working voltage value is less than or equal to a first trigger voltage value, to increase the voltage value of the output port of the converter circuit to a first ride-through voltage value, and the first ride-through voltage value is greater than the first trigger voltage value; and
   the drive control circuit is configured to:
   in a process in which the converter circuit outputs the first reactive current to the power grid, when it is detected that the voltage value of the output port of the converter circuit increases to a third working voltage value and the third working voltage value is greater than or equal to a first recovery voltage value, control the converter circuit to output a second reactive current to the power grid, to recover the voltage value of the output port of the converter circuit to the first working voltage value, and the first recovery voltage value is greater than the first ride-through voltage value.

2. The power supply system according to claim 1, wherein the drive control circuit is further configured to:
   in the process in which the converter circuit outputs the first reactive current to the power grid, when it is detected that the voltage value of the output port of the converter circuit is less than the first recovery voltage value and duration in which the converter circuit transmits the first reactive current to the power grid is greater than or equal to first ride-through duration, control the converter circuit to output a third reactive current to the power grid, to recover the voltage value of the output port of the converter circuit to the first working voltage value.

3. The power supply system according to claim 1, wherein the converter circuit is further configured to:
   output a fourth reactive current to the power grid when the voltage value of the output port of the converter circuit increases from a fourth working voltage value to a fifth working voltage value and the fifth working voltage value is greater than or equal to a second trigger voltage value, to decrease the voltage value of the output port of the converter circuit to a second ride-through voltage value, and the second ride-through voltage value is less than the second trigger voltage value; and
   the drive control circuit is further configured to:
   in a process in which the converter circuit outputs the fourth reactive current to the power grid, when it is detected that the voltage value of the output port of the converter circuit decreases to a sixth working voltage value and the sixth working voltage value is less than or equal to a second recovery voltage value, control the converter circuit to output a fifth reactive current to the power grid, to recover the voltage value of the output port of the converter circuit to the fourth working voltage value, and the second recovery voltage value is less than the second ride-through voltage value.

4. The power supply system according to claim 3, wherein the drive control circuit is further configured to:

in the process in which the converter circuit outputs the fourth reactive current to the power grid, when it is detected that the voltage value of the output port of the converter circuit is greater than the second recovery voltage value and duration in which the converter circuit transmits the fourth reactive current to the power grid is greater than or equal to second ride-through duration, control the converter circuit to transmit a sixth reactive current to the power grid, to recover the voltage value of the output port of the converter circuit to the fourth working voltage value.

5. The power supply system according to claim 1, wherein the power generation apparatus is a photovoltaic power generation apparatus, a wind power generation apparatus, a thermal power generation apparatus, a nuclear power generation apparatus, a chemical power generation apparatus, or a biomass power generation apparatus.

6. The power supply system according to claim 5, wherein the power generation apparatus is a photovoltaic power generation apparatus, the power supply system further comprises a combiner box, and the power generation apparatus is connected to the converter circuit by using the combiner box.

7. The power supply system according to claim 6, further comprising:
a direct current bus, wherein the power generation apparatus is connected to the direct current bus by using the combiner box and the direct current bus is connected to the converter circuit.

8. The power supply system according to claim 7, further comprising:
a transformer, wherein the converter circuit is connected to the power grid by using the transformer.

9. The power supply system according to claim 8, further comprising:
an on/off-grid wiring apparatus, wherein the transformer is connected to the power grid by using the on/off-grid wiring apparatus.

10. The power supply system of claim 6, wherein a plurality of photovoltaic strings is connected in parallel to the combiner box.

11. The power supply system of claim 7, wherein the direct current bus comprises a plurality of bus capacitors connected in series to each other.

12. A current conversion method for a power supply system, wherein the current conversion method is applicable to the power supply system according to claim 1, and the current conversion method comprises:
outputting, by a converter circuit, a first reactive current to a power grid when it is detected that a voltage value of an output port of the converter circuit decreases from a first working voltage value to a second working voltage value and the second working voltage value is less than or equal to a first trigger voltage value, to increase the voltage value of the output port of the converter circuit to a first ride-through voltage value, wherein the first ride-through voltage value is greater than the first trigger voltage value; and
in a process in which the converter circuit outputs the first reactive current to the power grid, when it is detected that the voltage value of the output port of the converter circuit increases to a third working voltage value and the third working voltage value is greater than or equal to a first recovery voltage value, controlling, by a drive control circuit, the converter circuit to output a second reactive current to the power grid, to recover the voltage value of the output port of the converter circuit to the first working voltage value, wherein the first recovery voltage value is greater than the first ride-through voltage value.

13. The current conversion method according to claim 12, further comprising:
in the process in which the converter circuit outputs the first reactive current to the power grid, when it is detected that the voltage value of the output port of the converter circuit is less than the first recovery voltage value and duration in which the converter circuit transmits the first reactive current to the power grid is greater than or equal to a first ride-through duration, controlling, by the drive control circuit, the converter circuit to output a third reactive current to the power grid, to recover the voltage value of the output port of the converter circuit to the first working voltage value.

14. The current conversion method of claim 13, wherein the first ride-through duration is user-defined.

15. The current conversion method of claim 13, wherein the first ride-through duration is a maximum low-voltage ride-through duration specified in a grid connection standard.

16. The current conversion method according to claim 12, further comprising:
outputting, by the converter circuit, a fourth reactive current to the power grid when it is detected that the voltage value of the output port of the converter circuit increases from a fourth working voltage value to a fifth working voltage value and the fifth working voltage value is greater than or equal to a second trigger voltage value, to decrease the voltage value of the output port of the converter circuit to a second ride-through voltage value, wherein the second ride-through voltage value is less than the second trigger voltage value; and
in a process in which the converter circuit outputs the fourth reactive current to the power grid, when it is detected that the voltage value of the output port of the converter circuit decreases to a sixth working voltage value and the sixth working voltage value is less than or equal to a second recovery voltage value, controlling, by the drive control circuit, the converter circuit to output a fifth reactive current to the power grid, to recover the voltage value of the output port of the converter circuit to the fourth working voltage value, wherein the second recovery voltage value is less than the second ride-through voltage value.

17. The current conversion method according to claim 16, further comprising:
in the process in which the converter circuit outputs the fourth reactive current to the power grid, when it is detected that the voltage value of the output port of the converter circuit is greater than the second recovery voltage value and duration in which the converter circuit transmits the fourth reactive current to the power grid is greater than or equal to second ride-through duration, controlling, by the drive control circuit, the converter circuit to transmit a sixth reactive current to the power grid, to recover the voltage value of the output port of the converter circuit to the fourth working voltage value.

18. The current conversion method of claim 16, wherein the second ride-through voltage is manually specified.

19. The current conversion method of claim 16, wherein the second ride-through voltage is a maximum low-voltage ride-through duration specified in a grid connection standard.

* * * * *